(12) United States Patent
Chin et al.

(10) Patent No.: US 7,186,304 B2
(45) Date of Patent: Mar. 6, 2007

(54) CARBO-NITRIDED CASE HARDENED MARTENSITIC STAINLESS STEELS

(75) Inventors: Herbert A. Chin, Portland, CT (US); William P. Ogden, Glastonbury, CT (US); David A. Haluck, Stuart, FL (US)

(73) Assignee: United Technologies Corporation, Hartford, CT (US)

( * ) Notice: Subject to any disclaimer, the term of this patent is extended or adjusted under 35 U.S.C. 154(b) by 40 days.

(21) Appl. No.: 10/859,371

(22) Filed: Jun. 2, 2004

(65) Prior Publication Data

US 2005/0268990 A1 Dec. 8, 2005

(51) Int. Cl.
*C22C 38/52* (2006.01)
*C23C 8/32* (2006.01)

(52) U.S. Cl. ......................................... 148/218; 420/38
(58) Field of Classification Search ................ 148/218; 420/38

See application file for complete search history.

(56) References Cited

U.S. PATENT DOCUMENTS 2,873,187 A * 2/1959 Dyrkacz et al. ............. 420/448
5,873,956 A * 2/1999 Tanaka et al. ............... 148/318

2002/0037120 A1 3/2002 Tanaka et al.

FOREIGN PATENT DOCUMENTS

GB 2 328 953 A 3/1999

OTHER PUBLICATIONS

Davis et al., ASM Handbook, 1995, ASM International, vol. 4, 376-378.*
Kassim S. Al-Rubaie et al., "Two-Body Abrasion of Nitrocarburised Steels for Hydraulic Cylinders", WEAR, vol. 243, 2000, pp. 112-121.

* cited by examiner

*Primary Examiner*—Roy King
*Assistant Examiner*—Michael P. Alexander
(74) *Attorney, Agent, or Firm*—Bachman & LaPointe

(57) ABSTRACT

A carbo-nitriding process for forming a martensitic stainless steel, which is case hardened and superior corrosion resistance over carburized process, is provided. A process for forming a martensitic stainless steel which is case hardened is provided. The process comprises the steps of providing a material consisting essentially of from 8.0 to 18 wt % chromium, cobalt up to 16 wt %, vanadium up to 5.0 wt %, molybdenum up to 8.0 wt %, nickel up to 8.0 wt %, manganese up to 4.0 wt %, silicon up to 2.0 wt %, tungsten up to 6.0 wt %, titanium up to 2.0 wt %, niobium up to 4.0 wt % and the balance iron, and carbo-nitriding to prescribed levels of C+N, to form a hard, corrosion resistance case in a fracture tough stainless steel.

11 Claims, 2 Drawing Sheets

CARBO-NITRIDED CASE HARDENED MARTENSITIC STAINLESS STEELS

STATEMENT OF GOVERNMENT INTEREST

The Government of the United States of America may have rights in this invention as a result of Contract No. F33615-01-C-2176 awarded by the Department of the Air Force.

BACKGROUND OF THE INVENTION (a) Field of the Invention

The present invention relates to carbo-nitrided case hardened martensitic stainless steels which have utility in bearings and gears for aerospace mechanical systems including gas turbine engines and rocket engines.

(b) Prior Art

Bearings and gears are routinely manufactured from stainless steel materials, some of which are routinely carburized case hardened. Such carburization results in the formation of hard carbides and a hard carbon rich martensite matrix necessary for bearing and gear load bearing capability. In the case of martensitic stainless steels, such carburization results in the formation of chromium rich carbides that deplete the steel matrix of chromium that is necessary for corrosion resistance. The depletion of the chromium is problematic because the desired protective $Cr_2O_3$ oxide, which creates the stainless behavior, is not formed as a continuous impervious barrier between the base metal and the environment (air, water, etc.).

SUMMARY OF THE INVENTION

Accordingly, it is an object of the present invention to provide a martensitic stainless steel, which has improved corrosion and debris resistance and improved fracture toughness properties.

It is a further object of the present invention to provide a martensitic stainless steel, which is carbo-nitrided case hardened.

The foregoing objects are attained by the present invention.

In accordance with the present invention a process for forming a carbo-nitrided case hardened martensitic stainless steel is provided. The process broadly comprises the steps of: providing a material consisting essentially of from 8.0 to 18 wt % chromium, cobalt up to 16 wt %, vanadium up to 5.0 wt %, molybdenum up to 8.0 wt %, nickel up to 8.0 wt %, manganese up to 4.0 wt %, silicon up to 2.0 wt %, tungsten up to 6.0 wt %, titanium up to 2.0 wt %, niobium up to 4.0 wt % and the balance iron; and carbo-nitriding said material to form at least one of a hard martensite phase and a nitride precipitates.

A suitable steel for the present invention is one whose metallurgical make-up is a martensitic stainless steel. Such steel should contain any or all the above elements in proportions necessary to preferentially form the thermally manageable carbo-nitrides such as $M_2N$, $MN$, $M_{23}C_6$, $M_6C$, and $M_2C$, where M represents any metal atom; and/or limit the formation of the more thermo-dynamically stable carbides such as $MC$ and $M_7C_3$.

There are a number of steels that may satisfy the above requirements, hence the broad range of elemental possibilities. To identify and optimize the steel composition for this invention, the metallurgical practitioner skilled in the art should employ prior experience of steel compositions capable of meeting the above requirements, or use metallurgical tools like ThermoCalc®, a phase computation code. Examples from ThermoCalc® work leading to this invention are shown in FIGS. 1 and 2.

Other details of the carbo-nitrided case hardened martensitic stainless steels of the present invention, as well as other objects and advantages attendant thereto, are set forth in the following detailed description.

DETAILED DESCRIPTION OF THE PREFERRED EMBODIMENT(S)

Figure 1:
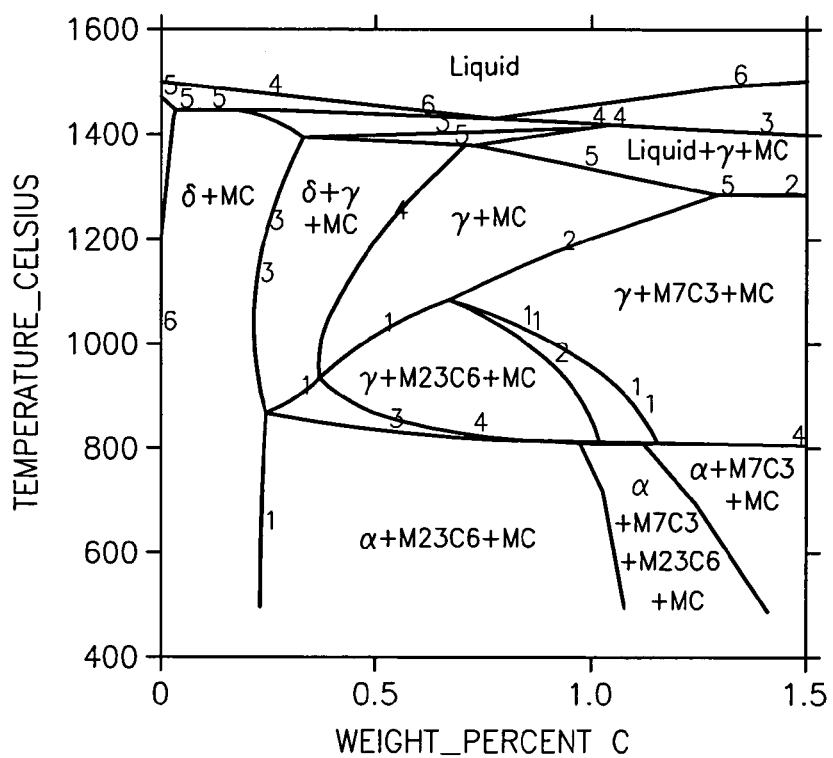
FIG. 1 is a phase diagram illustrating an iron alloy with a strong propensity to form undesired $M_7C_3$ and MC carbides.
Figure 2:
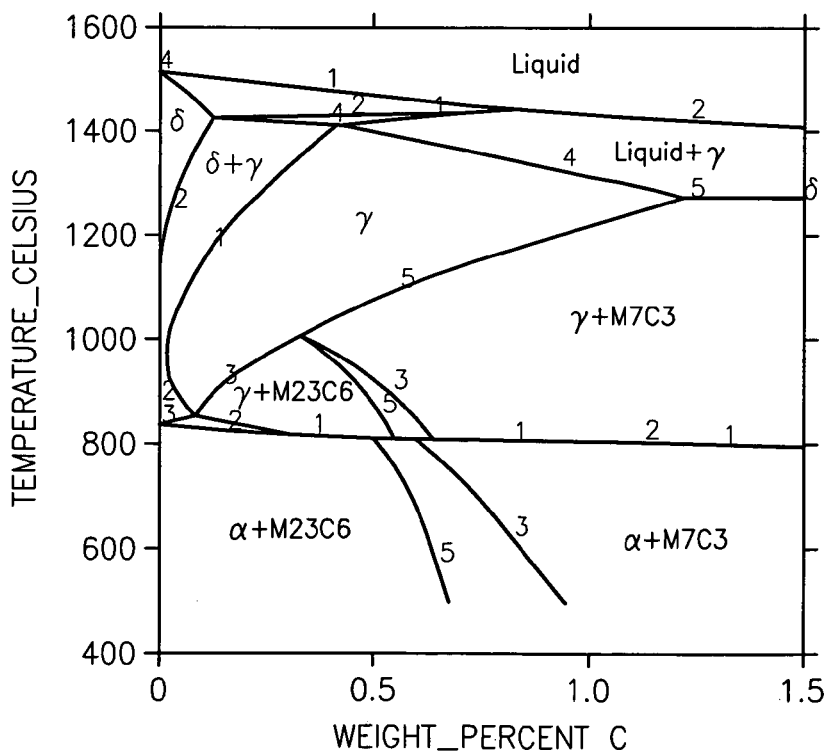
FIG. 2 is a phase diagram illustrating a preferred formulation to preferentially form $M_{23}C_6$ carbides.

As discussed above the process of the present invention relates to a process for forming a case hardened, fracture tough martensitic stainless steel which can be used to form the core of a bearing or a gear sub-component. The carbo-nitrided hardened case is the basis of the load bearing surface of the bearing or gear.

The process of the present invention begins with the formation of an article such as the core of a bearing or a gear sub-component from a stainless steel having a composition consisting essentially of from 8.0 to 18 wt % chromium, up to 16 wt % cobalt, up to 5.0 wt % vanadium, up to 8.0 wt % molybdenum, up to 8.0 wt % nickel, up to 4.0 wt % manganese, up to 2.0 wt % silicon, up to 6.0 wt % tungsten, up to 2.0 wt % titanium, up to 4.0 wt % niobium, and the balance iron.

There are a number of steels that can be used in the present invention, e.g. PYROWEAR 675 made by Carpenter Technologies having a composition in wt %: Fe-13Cr-5.4Co-1.8Mo-2.6Ni-0.6Mn-0.6V-0.4Si-0.07C; CSS-42L made by Latrobe Steel having a composition in wt %: Fe-14Cr-12.4Co.4.7Mo-2.05Ni-0.6V-0.05C; and AFC-77 made by Crucible Research.

Other alloys which may be used have a composition in wt % as follows:

(1) Fe-13.75Cr-5Co-3Mo-3Ni-0.08V-0.75Mn-0.4Si-0.15C;
(2) Fe-14Cr-5Co-4Mo-3.5Ni-0.08V-0.22Mn-0.3Si0.15C;
(3) Fe-13.5Cr-3.75Co-3.5Mo-3Ni-0.08V-0.25Mn-0.3Si-0.15C;
(4) Fe-13.5Cr-3.75Co-3.5Mo-3Ni-1Ti-1Mn-0.3Si-0.15C;
(5) Fe-15.25Cr-5Co-3.5Mo-4Ni-0.25V-0.2Mn-0.25Si-0.15C; and
(6) Fe-14Cr-2.75Co-3.25Mo-3.5Ni-0.3V-0.3Mn-0.3Si-0.15C.

After being formed into a desired article, the stainless steel material is subjected to a carbo-nitriding process. Processes capable of carbo-nitriding the aforementioned martensitic stainless steel material to the condition as set forth in this invention are:

1. A carbo-nitriding process at a pressure of 1 atmosphere and a temperature which varies with steel composition and is typically in the range of 1650 to 2000° F. for a time which varies according to desired case depth, from 40 to 200 hrs. typically. The atmosphere composition has carbon and nitrogen "potentials" as indicated below. Typically, the carbon and nitrogen (C+N) levels are less than the aim level due to a "gettering" effect by the steel during carbo-nitriding process;

2. Vacuum carbo-nitriding process at a pressure and a temperature which varies with steel composition, typically in the range of 1650 to 2000° F. for a time which varies according to the desired case depth, from 40 to 200 hrs. typically. The atmosphere composition has carbon and nitrogen "potentials" as indicated below. Typically, the C+N levels are less than the aim level due to a "gettering" effect by the steel during carbo-nitriding process; and 3. Plasma carbo-nitriding process at a pressure and a temperatures which varies with steel composition, typically in the range of 1650 to 2000° F. for a time which varies according to desired case depth, from 40 to 200 hrs. typically. The atmosphere composition has carbon and nitrogen "potentials" as indicated below. Typically, the C+N levels are less than the aim level due to a "gettering" effect by the steel during carbo-nitriding process.

The above processes must be conducted to produce prescribed levels of carbon (0.2 to 0.55 wt %) and nitrogen (0.2 to 1.2 wt %) in the hardened case for attaining goal hardness and corrosion resistance as follows:

Total carbon+nitrogen in the range of from 0.5 to 1.7 wt % for hardness;

Carbon+nitrogen levels in treated surface case limited to ensure chromium content of carbo-nitrided case >8 wt %, for good corrosion resistance. An example of this requirement is indicated below. For 0.35 wt % carbon+ 0.4 wt % nitrogen, the chromium content of the matrix is >8 wt %.

Figure 3:
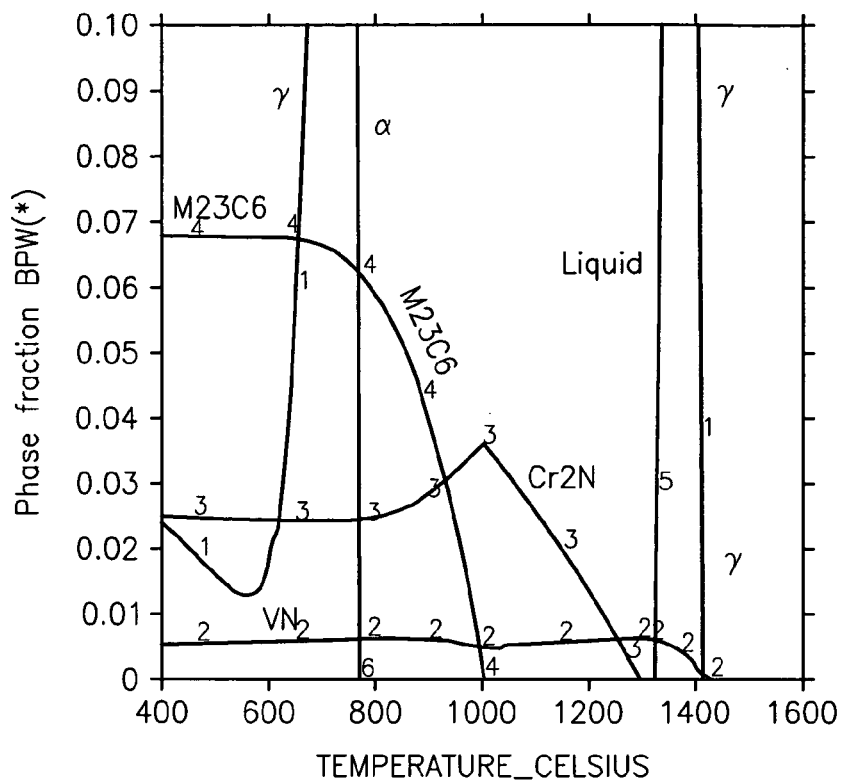
FIG. 3 illustrates the performance of a PYROWEAR 675 Case with 0.35% carbon and 0.4% nitrogen.
Figure 4:
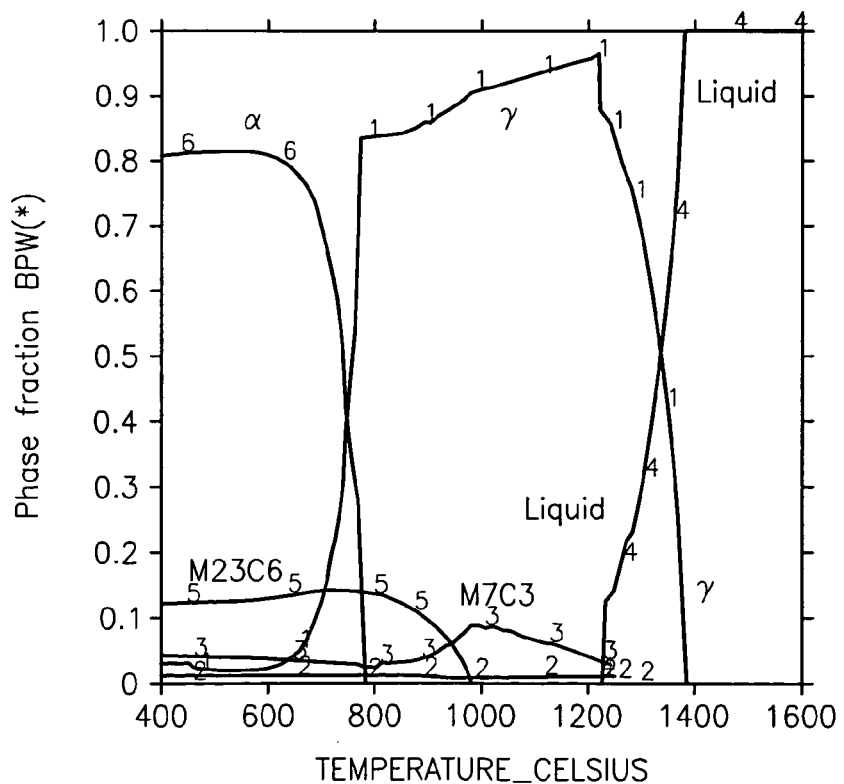
FIG. 4 illustrates the performance of a PYROWEAR 675 Case with 1% carbon.

FIG. 3 illustrates the performance of a Pyrowear 675 case with 0.35% carbon and 0.4% nitrogen. The case had no Pesky $M_7C_3$ carbides, solutionable $M_{23}C_6$ carbides, and semi-coherent $Cr_2N$ nitride. FIG. 4 shows the performance of a Pyrowear 675 case with 1% carbon which had pesky $M_7C_3$ carbides.

For the case of carburization only to 1% carbon in case, excessive $M_{23}C_5$ and $M_7C_3$ carbides are formed that deplete the steel matrix of chromium. Work leading to this invention show the chromium content of carburized only Pyrowear 675 (with 1 wt % carbon) is ~5.4 wt %. This results in poor corrosion resistance of the carburized case, as shown below.

The carbo-nitriding step forms a hard martensite phase and/or hard nitride or carbo-nitride precipitates. The nitrogen enhances the corrosion resistance of the stainless steels, strengthens the surface resistance to debris damage through martensite strengthening, formation of semi-coherent carbo-nitride precipitates, and the development of case compressive residual stress during subsequent harden and temper heat treatment, and does not deplete the steel matrix of significant protective chromium in the form of $Cr_2O_3$ oxide.

The metallurgical make-up or phase constituents of the base stainless steel composition is a martensitic stainless steel comprised of a martensite matrix with carbides, nitrides, and carbo-nitride precipitates in the case hardening region.

For low stress or moderate performance bearings and gears: Volume fraction range for hard precipitates (carbides, nitrides or carbo-nitrides) is 1 to 10%.

For high stress or high performance bearings and gears: Volume fraction range for hard precipitates (carbides, nitrides or carbo-nitrides) is 8 to 40%.

Carbon+nitrogen levels in treated surface case limited to levels, along with related heat treatments, that ensure that the hard precipitates are a uniform dispersion of predominantly discrete precipitates in the martensitic matrix.

Materials formed in accordance with the present invention can be used for bearings and gears for gas turbine, rocket engines, and other mechanical systems in need of corrosion protection including, but not limited to, mechanical systems used in the air conditioning and food industries.

It is apparent that there has been provided in accordance with the present invention carbo-nitrided case hardened martensitic stainless steels which fully satisfy the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A process for forming a martensitic stainless steel which is case hardened comprising the steps of:

forming an article from a material consisting essentially of from 8.0 to 18 wt % chromium, cobalt up to 16 wt %, vanadium up to 0.5 wt %, molybdenum up to 8.0 wt %, nickel up to 8.0 wt %, manganese up to 4.0 wt %, silicon up to 2.0 wt %, tungsten up to 6.0 wt %, titanium up to 2.0 wt %, niobium up to 4.0 wt % and the balance iron; and producing a hardened case containing from 0.2 to 0.55 wt % carbon and from 0.2 to 1.2 wt % nitrogen on said article;

said hardened case producing step comprising carbo-nitriding said article to form at least one of a hard martensite phase and nitride precipitates, wherein said carbo-nitriding step comprises forming said at least one of a hard martensite phase and nitride precipitates by heating said material in an atmosphere containing carbon and nitrogen at a temperature in the range of 1650 degrees Fahrenheit to 2000 degrees Fahrenheit for a time in the range of from 40 to 200 hours.

2. A process according to claim 1, wherein said carbo-nitriding step produces a hardened case having a total amount of carbon and nitrogen in the range of 0.5 to 1.7 wt %.

3. A process according to claim 1, wherein said carbo-nitriding step comprises controlling carbon and nitrogen levels so that a chromium content of said carbo-nitrided case is greater than 8.0 wt %.

4. A process according to claim 1, wherein said material providing step comprises providing a material consisting of 13 wt % chromium, 5.4 wt % cobalt, 1.8 wt % molybdenum, 2.6 wt % nickel, 0.6 wt % manganese, 0.6 wt % vanadium, 0.4 wt % silicon, 0.07 wt % carbon, and the balance iron.

5. A process according to claim 1, wherein said material providing step comprises providing a material consisting of 14 wt % chromium, 12.4 wt % cobalt, 4.7 wt % molybdenum, 2.05 wt % nickel, 0.6 wt % vanadium, 0.05 wt % carbon, and the balance iron.

6. A process according to claim 1, wherein said material providing step comprises providing a material consisting of 13.75 wt % chromium, 5.0 wt % cobalt, 3.0 wt % molybdenum, 3.0 wt % nickel, 0.08 wt % vanadium, 0.75 wt % manganese, 0.4 wt % silicon, 0.15 wt % carbon, and the balance iron.

7. A process according to claim 1, wherein said material providing step comprises providing a material consisting of 14 wt % chromium, 5.0 wt % cobalt, 4.0 wt % molybdenum, 3.5 wt % nickel, 0.08 wt % vanadium, 0.22 wt % manganese, 0.3 wt % silicon, 0.15 wt % carbon, and the balance iron.

8. A process according to claim 1, wherein said material providing step comprises providing a material consisting of 13.5 wt % chromium, 3.75 wt % cobalt, 3.5 wt % molybdenum, 3.0 wt % nickel, 0.08 wt % vanadium, 0.25 wt % manganese, 0.3 wt % silicon, 0.15 wt % carbon, and the balance iron.

9. A process according to claim 1, wherein said material providing step comprises providing a material consisting of 13.5 wt % chromium, 3.75 wt % cobalt, 3.5 wt % molybdenum, 3.0 wt % nickel, 1.0 wt % titanium, 1.0 wt % manganese, 0.3 wt % silicon, 0.15 wt % carbon, and the balance iron.

10. A process according to claim 1, wherein said material providing step comprises providing a material consisting of 15.25 wt % chromium, 5.0 wt % cobalt, 3.5 wt % molybdenum, 4.0 wt % nickel, 0.25 wt % vanadium, 0.2 wt % manganese, 0.25 wt % silicon, 0.15 wt % carbon, and the balance iron.

11. A process according to claim 1, wherein said material providing step comprises providing a material consisting of 14 wt % chromium, 2.75 wt % cobalt, 3.25 wt % molybdenum, 3.5 wt % nickel, 0.3 wt % vanadium, 0.3 wt % manganese, 0.3 wt % silicon, 0.15 wt % carbon, and the balance iron.

* * * * *